July 15, 1941.  A. M. STENGER  2,249,059

ROTARY FLUID PUMP

Filed Feb. 28, 1939

INVENTOR
August M. Stenger
BY
HIS ATTORNEY

Patented July 15, 1941

2,249,059

UNITED STATES PATENT OFFICE 2,249,059

ROTARY FLUID PUMP

August M. Stenger, Painted Post, N. Y., assignor to Ingersoll-Rand Company, Jersey City, N. J., a corporation of New Jersey Application February 28, 1939, Serial No. 258,884

4 Claims. (Cl. 103—121)

This invention relates to a rotary fluid pump and, more particularly, to a rotary lubricating pump wherein the pump cylinder is rotated.

In ordinary rotary pumps of this type a stationary cylinder is provided wherein a vaned rotor is placed which, upon rotation, pumps the fluid supplied thereto. In accordance with this invention, the cylinder is rotated and the ordinarily rotating rotor is held stationary. Furthermore, the cylinder is of magnetic material while the vane or blade is a permanent magnet so that it will be held against the cylinder at all times. With this arrangement there are a great many advantages.

One of the chief advantages is that the pump is very compact and may be easily placed on the end of the shaft of an engine thus doing away with gears and the like which are usually necessary to drive the pump. The invention, consequently, lends itself to economical operation since there is no mechanism necessary to transmit driving power to the pump and, as a result, there need be no power loss in the power transmission.

Furthermore, the number of parts is reduced to a minimum and the pump is very easy to assemble and repair.

Another advantage is that no spring or other device is required to hold the vane against the cylinder in sealing engagement.

Figure 1:
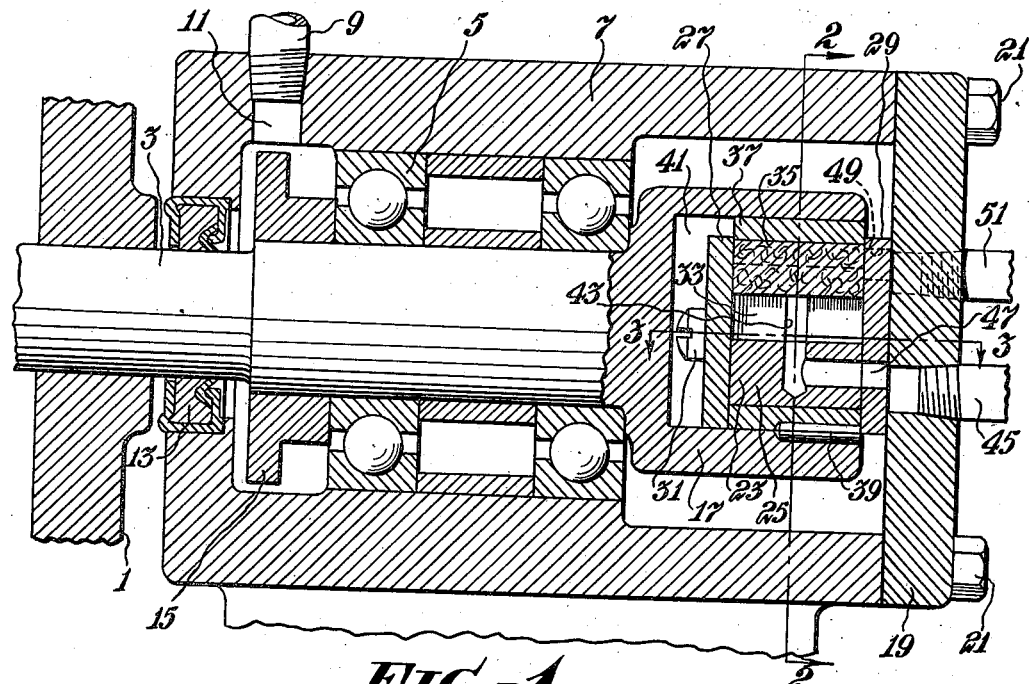
Figure 2:
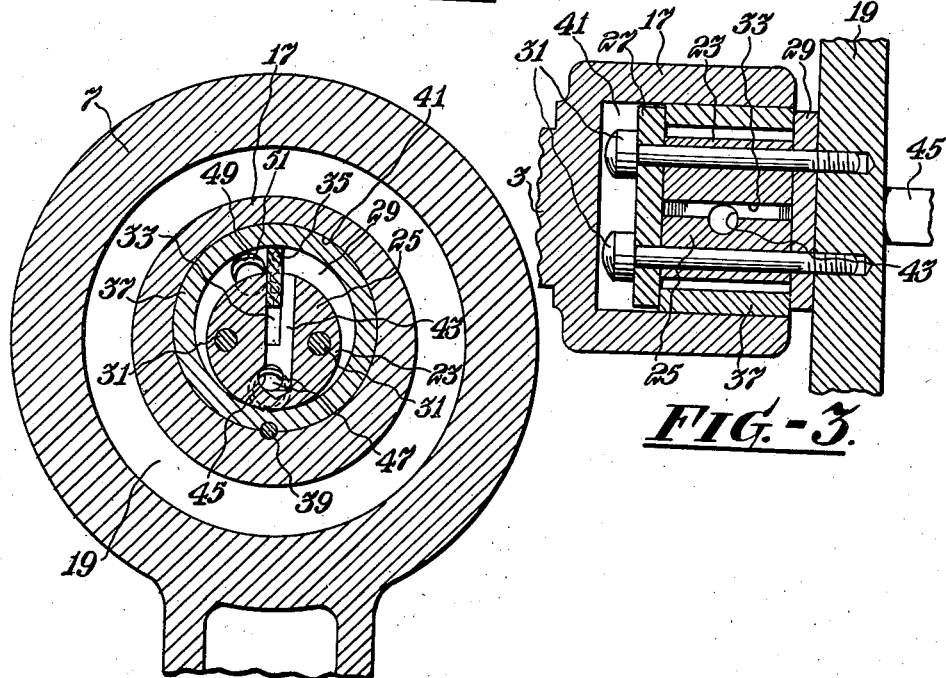
Figure 3:
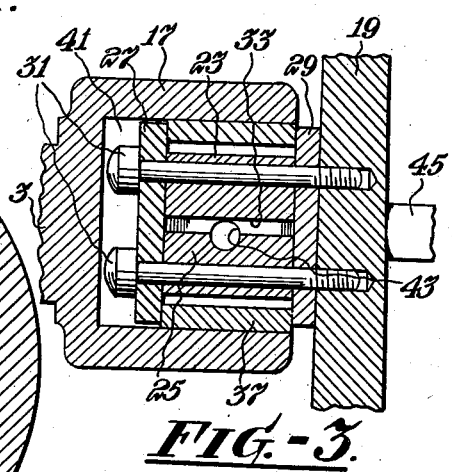

These and other advantages will be apparent from the following description of which the drawing forms a part and in which Figure 1 is a view in section of the present invention associated with the shaft of a prime mover, Figure 2 is a view in section taken along the line 2—2 of Fig. 1, Figure 3 is a sectional view of apparatus shown in Fig. 1 taken along the line 3—3.

For the sake of convenience, the present invention is shown in the drawing as consisting of a fluid pump adapted for pumping a lubricant associated with an engine generally indicated at 1. The shaft 3 of the engine extends into the bearing 5 which is provided in casing 7. Lubricant is supplied to this bearing through the conduit 9 communicating with the port 11 extending through the wall of the casing 7. In order to prevent leakage of lubricant along the shaft and through the opening provided to permit the shaft to extend into the casing 7, a sealing means generally indicated at 13 surrounds the shaft 3. This sealing means may be of any suitable design and the details of the device shown being conventional in nature will not be described.

Since it is desirable to have little or no lubricant flowing along the shaft toward the sealing means 13, an oil ring or lubricant thrower 15 is placed on the shaft 3 adjacent the bearing 5. This device serves to constantly, upon rotation of the shaft, throw any lubricant tending to flow along the shaft out against the wall of the casing 7.

The end of the shaft 3 is enlarged to form a rotatable cylinder or cup 17. The casing 7 is closed at its outer end by the end plate 19 secured by bolts 21 to the casing. To this end plate is secured the stationary means or core 23 of the pump. The stationary means comprises a core proper 25 interposed between two plates 27 and 29 and the entire assembly is secured to the end plate by the bolts 31. In the core 25 is an aperture or slot 33 arranged to receive a vane 35. A liner 37 is keyed to the cylinder 17 by key 39 in order that it may rotate with the shaft. The vane 35 is a permanent magnet and by making the liner 37 of a magnetic material the vane will bear continuously against this liner and wipe the inner surface thereof. The plates 27 and 29 are preferably made of a non-magnetic material to prevent any deflection of the vane from the liner.

Of course, the vane could be held against the liner by other suitable means such as a spring and once the cylinder is rotating the fluid or oil pressure will help hold the vane against the liner.

As will be seen from Fig. 2, the recess 41 forming the inside of the cylinder 17 is eccentrically placed with respect to the center of the shaft itself. As a result, when the shaft rotates, the liner 37 will push the vane 35 in and out in its slot 33. This is readily understood when it is remembered that the liner 37 is eccentric to the core 25 and that, consequently, as the liner moves around the core 25 the narrow clearance space between the core and liner, adjacent the key 39, moves over the vane 35, once during each revolution of the shaft. When the narrow clearance space between the core and liner is over vane 35 the pressure on the oil to the left of the vane 35 is at a maximum which prevents oil from entering through port 49 and flowing directly to the outlet port 47.

The core 25 is also provided with an aperture 43 communicating with the slot 33 and with the outlet conduit 45 by means of bore 47 extending through the core 25 and plate 29. Fluid is supplied to the pump by the port 49 in plate 29 which, in turn, communicates with the inlet conduit 51 extending into the end plate 19.

If the shaft is rotating in a counter-clockwise direction and oil or other fluid is supplied by the conduit 51 through port 49 to the space between the core 25 and the liner 37, it will be apparent that, as the rotation occurs, the oil will be carried in a counter-clockwise direction around the outer wall of the core 25 until it is stopped by the vane 35 and permitted to escape through the aperture 43 and the outlet conduit 45. It is obvious that any oil which has passed through this pump will escape through conduit 45 at a higher pressure than the oil supplied through conduit 51. If it were desirable to have a shaft rotating in a clockwise direction, it would only require a change in the position of the vane 35 with respect to the slot 43.

From the above description it will be seen that I have provided a novel pump which requires little space and is readily adaptable in a lubricating system for use on the end of a shaft of a motor engine or compressor. Those skilled in the art, of course, may make certain modifications without departing from the scope of this invention and I do not wish to be limited save as defined in the appended claims.

I claim:

1. In a lubricant pump for the end of a rotating shaft supported by a bearing enclosed by a casing and an end plate, a pump cylinder formed on the end of the shaft having a chamber eccentric to the shaft, a stationary core extending into the pump cylinder chamber and secured to the end plate, a liner of magnetic material in the pump cylinder chamber, an elongated aperture in the core, a magnet forming a vane slidably mounted in the aperture continuously bearing against the liner and held thereagainst by magnetism, a lubricant supply conduit extending through the end plate, a port in the stationary core at one side of the vane communicating with the supply conduit to admit lubricant to the pump, a bore in the stationary core extending into and along the elongated aperture on the opposite side of the vane, and a lubricant outlet conduit extending through the end plate and communicating with said bore to remove lubricant from the pump.

2. In a rotary fluid pump, a stationary means, movable magnet means, an aperture in the stationary means to receive the movable means, a rotatable cylinder surrounding the stationary means eccentrically placed with respect thereto, a liner of magnetic material secured in the cylinder against which said movable means bears continuously being held thereagainst by magnetism, a port to introduce fluid into the space between the liner and stationary means on one side of the movable means, a fluid supply conduit to supply fluid to said port, a bore in the stationary core on the opposite side of said movable means extending into the aperture to remove fluid from said space, and a fluid outlet conduit to remove fluid from said bore.

3. In a rotary fluid pump, a stationary means, a magnet forming a movable vane, an aperture in the stationary means to receive the vane, a cylinder surrounding the stationary means eccentrically located with respect thereto, a liner of magnetic material secured in the cylinder against which the magnet bears continuously being held in engagement by magnetism, means to rotate the cylinder and liner, a port in the stationary means for the cylinder at one side of the magnet, a conduit communicating with the port to conduct fluid to the cylinder, a bore extending into and along the first said aperture on the opposite side of the magnet, and a second conduit in the stationary means communicating with the bore to remove fluid from the cylinder.

4. In a rotary fluid pump, a stationary means, a magnet forming a vane, an aperture in the stationary means to receive the magnet, a rotatable cylinder surrounding the stationary means eccentrically placed with respect thereto, a liner of magnetic material secured in the cylinder against which said magnet bears continuously being held in engagement by magnetism, a port in the stationary means to introduce fluid into the space between the liner and stationary means on one side of the magnet, a fluid supply conduit to supply fluid to said port, a bore in the stationary core on the opposite side of the magnet extending into the aperture to remove fluid from said space, and a fluid outlet conduit to remove fluid from said bore.

AUGUST M. STENGER.